INVENTOR.
William J. Shimanckas

United States Patent Office 3,362,375
Patented Jan. 9, 1968

3,362,375
REVERSIBLE MARINE PROPULSION DEVICE WITH ELECTROMAGNETICALLY ACTUATED PLANETARY GEARING
William J. Shimanckas, Waukegan, Ill., assignor to Outboard Marine Corporation, Waukegan, Ill., a corporation of Delaware
Filed June 22, 1965, Ser. No. 465,905
28 Claims. (Cl. 115—41)

ABSTRACT OF THE DISCLOSURE

Disclosed herein is a marine propulsion device including a transmission including a planetary gear train having a gear carrier. Also included in the transmission are first and second fixed electromagnetic coils which are operable to connect a driving member to the gear carrier for common rotation or to fix the gear carrier against rotation. The arrangement is such that energizing of either of the coils affects movement of a member into interfering position with respect to normal operation in response to energizing of the other coil, thereby to prevent "locking" or "freezing" of the transmission.

---

This invention relates to marine propulsion devices and, more particularly, to marine propulsion transmission devices, including electromagnetically operable clutches. This invention also relates to transmission devices.

In the past, marine propulsion lower units including power transmission means having a pair of electromagnetic coils have been employed to drivingly connect a drive shaft to a propeller shaft to selectively afford forward and rearward drive conditions. The present invention is directed to a transmission device or means including a pair of electromagnetic coils wherein energizing of the respective coils affords driving engagement between the drive shaft and the propeller in differing rotative directions and additionally prevents locking of the transmission means due to subsequent concurrent energizing of the other coil.

The invention also provides for a transmission means including a planetary gear means connecting the drive shaft to the propeller shaft. There is also additionally provided means for drivingly connecting the planetary drive member and the planetary gear carrier for common rotation and means for preventing rotation of the planetary gear carrier. In the specifically disclosed construction, the means for drivingly connecting the planetary gear carrier to the planetary drive and the means for preventing planetary carrier rotation each include an electromagnetic coil. Moreover, as already pointed out, the invention also provides means preventing locking up of the transmission means if both coils are concurrently energized.

The invention further provides, independently of a marine propulsion lower unit, an electromagnetically operated planetary gear transmission means, such transmission means also including means for preventing locking thereof in response to concurrent energizing of two electromagnetic coils.

Other objects and advantages of the invention will become known by reference to the following description and accompanying drawings in which.

Figure 1:
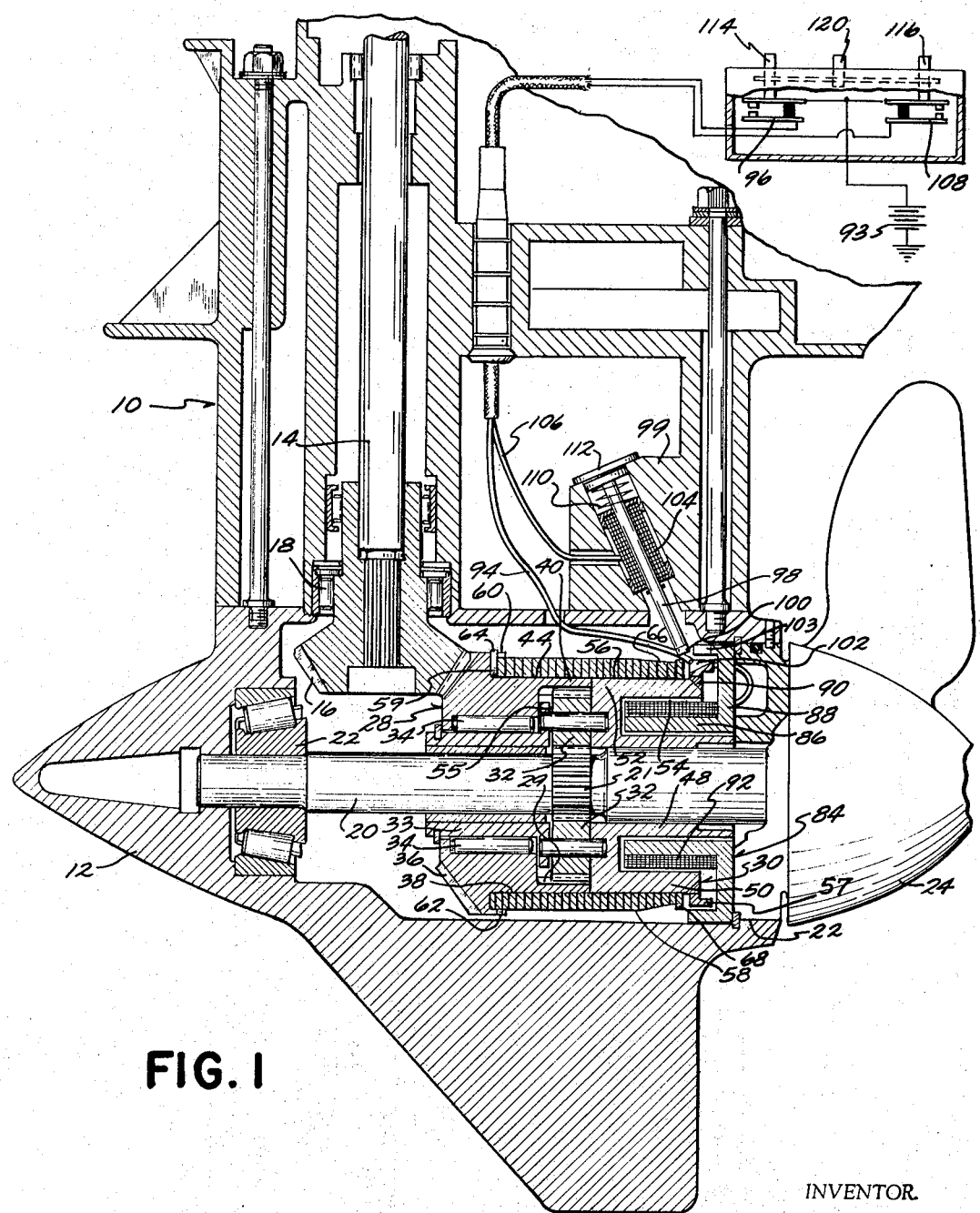
FIGURE 1 is a fragmentary elevational view, partially broken away and in section, of a marine propulsion lower unit embodying various of the features of the present invention.

The marine propulsion device of the present invention generally includes an upright, hollow strut 10 which carries a gear housing 12 at its lower end and which is adapted to be mounted on a boat. The drive shaft 14 is rotatably carried on the strut 10 and includes a driving bevel gear 16 which extends into the gear housing 12 and which is journalled by means of a bearing 18. A propeller shaft 20 having a pinion portion 21 is rotatably mounted in the gear housing 12 below the gear 16 by means of suitable bearings 22 with one end of propeller shaft 20 extending from the gear housing 12 and carrying a propeller 24. Any appropriate source of power (not shown) can be employed to drive the drive shaft 14.

A transmission or drive is provided for selectively connecting drive shaft 14 to the propeller shaft 20 to provide for rotation of the propeller shaft 20 in each rotative direction and to allow rotation of the drive shaft 14 independently of the propeller shaft 20. In the preferred embodiment of the invention, the transmission includes planetary gear means which comprises a driver and a carrier and which connects the drive shaft 14 to the propeller shaft 20. The transmission also includes means for preventing rotation of the carrier and a clutch for rotatively connecting the driver and the carrier. As will also appear, various components of the transmission also constitute a means for preventing "locking" or "freezing" of the transmission.

More particularly, the planetary gear means comprises the pinion portion 21 on the propeller shaft 20, a first driving element or member 28 including a ring gear 29, a second element or member 30 which constitutes the carrier, and one or more pinions 32 rotatably mounted on the carrier in meshed engagement with the ring gear and the pinion portion 21.

The first element 28 is rotatably carried on an extended hub portion 33 of the second element 30 by means of a bearing 34 for independent rotation relative to the second element 30, and is provided with a bevel gear 36 engaged with bevel gear 16 of drive shaft 14. The first element 28 is also provided with a cylindrical portion 38 having an axially extending flange 40, which flange includes the inner ring gear 29. The cylindrical portion 38 and the axially extending flange define a cylindrical surface 44.

The second element 30 is rotatably mounted on the propeller shaft 20. Thus, the carrier element 30 can rotate independently of the propeller shaft 20 and of the first element 28. In addition to the extended hub portion 33, the second or carrier element 30 is provided with a hub 48 rotatably carried on the propeller shaft 20, a ferro-magnetic cylindrical portion 50 spaced from the hub 48 and a radial portion 52 which rotatably carries the pinions 32 and which also connects the hub 48 to the cylindrical portion 50 so as to define a circular slot 54. The radial portion 52 is provided with a series of radial slots 55 in which are disposed the pinions 32. The cylindrical portion 50 defines a cylindrical outer surface 56 which is axially aligned with the cylindrical surface 44 of the first element 28. Extending radially outwardly from adjacent one end of the cylindrical surface 56 is a ferro-magnetic pole or part 57.

The clutch comprises the driver or member 28, the carrier or member 30, and a wrap spring 58 disposed around the aligned cylindrical surfaces 44 and 56 of the first and second members 28 and 30 to afford common rotary movement of the first and second members. This occurrence will be hereinafter described in greater detail. One end of spring 58 includes a first coil 59 which is fixed to the first member 28 by means of a flange 60. The flange 60 extends from the bevel gear 36 and overhangs the cylindrical surface 44. A notch 62 is provided in the flange 60 to receive an out-turned finger 64 extending from the first coil 59 of the wrap spring 58.

The other end of spring 58 includes in free-end portion 66 which partially encircles the cylindrical surface 56 of the second member 30 and which is normally free of pressure engagement with or connection to the second member. The free-end portion 66 includes at least one terminal coil 68 of magnetizeable material, which terminal coil 68 is axially spaced from the radial part or pole 57.

Means comprising a part of the transmission or drive is also provided for actuating the clutch means to afford rotation of the propeller shaft in one direction. Various means, either electrical, mechanical or hydraulic, can be employed to actuate the clutch means. Such actuating means can also be regarded as a component of the clutch means.

In the disclosed construction, said means includes a electromagnetic means for establishing an electromagnetic flux on a path including the cylindrical portion 50 of the carrier member 30, the ferro-magnetic pole 57, and the terminal coil 68 of wrap spring 58. In the preferred embodiment, said electromagnetic means includes a fixed part 84 carried on the strut 10 in coaxial relationship to the propeller shaft 20. The fixed part 84 includes an axial portion 86 disposed in the slot 54 and a radial portion or pole 88 disposed proximate the pole or part 57. The radial portion 88 preferably has a radial extent at least as large as the pole 57 and the terminal coil 68.

In order to afford flux flow through the terminal coil, flux resisting means comprising a frusto-conical insert 90 of non-magnetic material is dispersed between the part or pole 57 and the cylindrical portion 50 of the second element 30. Said means for actuating said clutch means further includes means for establishing an electromagnetic flux on the above-described flux path and comprising a coil or electrical winding 92 encircling the axial portion 86 of the fixed part 84 and also fitting in the slot 54. An electro-magnetic flux is produced on the flux path by energizing the coil 92 with a battery 93, shown diagrammatically in FIGURE 1. As shown in FIGURE 1, leads 94 connect the coil 92 through a switch 96 to the battery 93.

Figure 2:
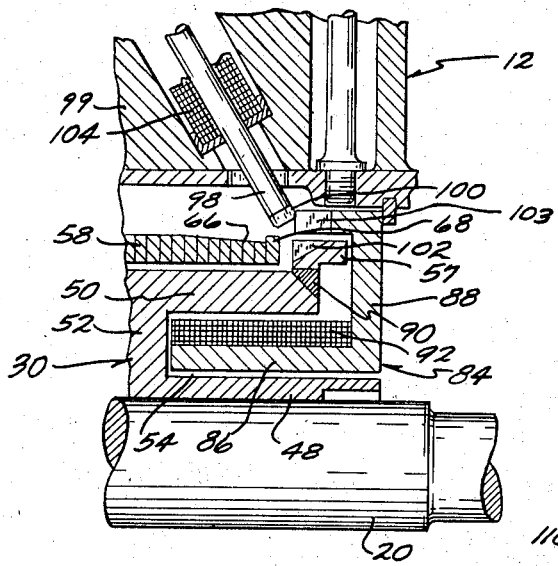
FIGURE 2 is an enlarged fragmentary detail of a portion of FIGURE 1 and illustrates the neutral condition of the transmission.

The means for engaging the transmission to prevent rotation of the carrier thereby affording rotation of the propeller shaft in the opposite direction includes means provided with a rod 98 carried by a portion 99 of the strut 10 in angular relationship to the propeller shaft 20. The rod 98 includes an end 100 which is proximate to and engageable with one of a series of notches 102 in the radial pole or part 57 of the carrier 30. The radial portion 88 of the fixed part 84 is provided with a notch or groove 103 to allow passage therethrough of the rod end 100. Various means can be employed, either mechanical, hydraulic or electrical, to actuate the rod 98. In the disclosed construction, an electromagnetic means is employed comprising a coil or electrical winding 104 disposed around the rod 98 and connected by means of leads 106 to a switch 108 which, in turn, is connected to the battery 93, to provide the necessary electrical current for energizing the coil 104 and accordingly move the rod 98 into engagement with one of the notches 102. The rod 98 is biased by a spring 110 to a position spaced from the part or pole 57, as shown in FIGURES 1 and 2. The spring 110 is carried by a removable cap 112 on the strut portion 99.

The switches 96 and 108 are actuated by push-buttons 114 and 116 respectively. Preferably, the switches are included in a mechanism including the push buttons 114 and 118, and a third or neutral push button 120. The mechanism is provided with interlocks of conventional type (not illustrated) so that any one of the push buttons will remain depressed to hold its related switch closed until released by depression of another button.

Referring now to FIGURE 2, when the push button 120 is depressed, neither of the coils 92 and 104 is energized. The wrap spring 58 is free of engagement with cylindrical surface 56 of the carrier 30, and the rod 98 is free of engagement with the notches 102, thereby defining a neutral drive condition of the marine propulsion device. In the neutral condition, rotation of the drive shaft 14 causes a rotation of the driver 28 relative to the propeller shaft 20, but does not necessarily rotate the propeller shaft 20.

Figure 4:
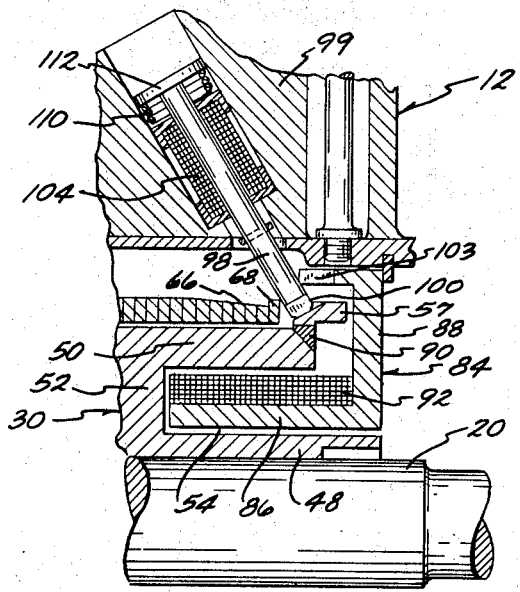
FIGURE 4 is a view similar to FIGURE 2, showing the position of the respective parts when the transmission is operative to effect rotation of the shaft in an opposite direction.

Referring now to FIGURE 4, depressing the button 116 allows the battery 93 to energize the coil 104, which, in turn, causes the rod 98 to axially move into engagement with one of the notches 102 thereby preventing rotation of the carrier 30 and affording rotation of the propeller shaft 20 in one direction. In the disclosed construction, the propeller shaft 20 will be rotated in a direction affording a reverse drive condition.

Figure 3:
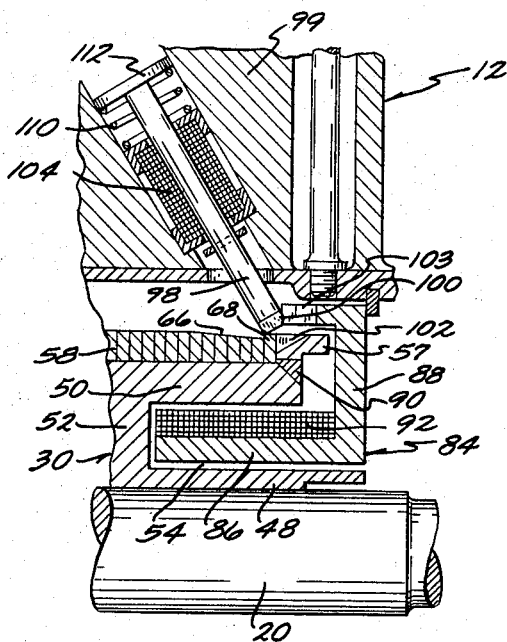
FIGURE 3 is a view similar to FIGURE 2 showing the position of the respective parts when the transmission is energized to effect a rotation of the shaft in one direction.

Referring now to FIGURE 3, when the button 114 is depressed, the coil 92 is energized by the battery 93 to produce an electromagnetic flux which is deflected by the frustoconical insert 90 through the terminal coil 68 and which travels on the flux path previously described and as shown by the arrows in FIGURE 3. The magnetic flux causes the terminal coil 68 to be axially attracted to the second pole or part 57 and to be radially attracted to the cylindrical surface 56 thereby effecting a wrapping or frictional engagement of the wrap spring 58 around the cylindrical surface 56 in operative pressure engagement therewith to afford common rotary movement of the driver 28 and carrier 30. The common rotary movements of the members 28 and 30 respectively causes the propeller shaft 20 to rotate in the direction opposite the direction afforded by preventing the rotation of the carrier 30, as previously described. In the disclosed construction, the propeller shaft 20 will rotate in a direction affording a forward drive condition. Furthermore, as shown in FIGURE 3, engagement of the terminal coil 68 with the part or pole 57 effectively blocks entry of the rod 98 into the notches 102 to prevent rotation of the carrier 30, thereby preventing locking-up of the marine propulsion device.

As shown in FIGURE 4, when the rod 98 is engaged with one of the notches 102, the spring 58 is blocked from axial advancement toward the pole 57. Hence, the spring 58 is prevented from gripping the carrier, thereby preventing up of the marine propulsion device.

From the foregoing, it is apparent that portions of the spring 58 and of the rod 98 which can interfere with each other constitute components of the means for preventing "locking-up" of the transmission.

Various of the features of the invention are set forth in the following claims.

What is claimed is:
1. A marine propulsion device including a strut, means adapted for mounting said strut to a boat for horizontal and vertical swinging movement, a drive shaft rotatably mounted on said strut, a propeller shaft rotatably mounted on said strut, planetary gear means connecting said drive shaft and said propeller shaft for rotation of said propeller shaft in either rotative direction and including a driving member, a planetary gear carrier, and means on said strut rotatably mounting said driving member and gear carrier for coaxial rotation independently of each other, means for preventing rotation of said carrier, and means for connecting said carrier and said driving member for common rotary movement.

2. A marine propulsion device including a strut, means adapted for mounting said strut to a boat for horizontal and vertical swinging movement, a drive shaft rotatably mounted on said strut, a propeller shaft rotatably mounted on said strut, and a transmission means for connecting said propeller shaft to said drive shaft to provide selective rotation of said propeller shaft in each rotative direction and to allow rotation of said drive shaft independently of said propeller shaft, said transmission means including a first electromagnetic means for engaging said transmission means to afford rotation of said propeller shaft in one direction, and a second eletcromagnetic means for engaging said transmission means to afford rotation of said propeller shaft in a direction opposite to the direction afforded by said first electromagnetic means, and mechanical means on said strut for preventing either one of said first and second electromagnetic means from engaging said transmission means when said transmission means is engaged by the other of said first and second electromagnetic means.

3. A marine propulsion device including a strut, means adapted for mounting said strut to a boat for horizontal and vertical swinging movement, a drive shaft rotatably mounted on said strut, a propeller shaft rotatably mounted on said strut, a propeller on said propeller shaft, transmission means for connecting said propeller shaft to said drive shaft to provide selective rotation of said propeller shaft in each rotative direction and to allow rotation of said drive shaft independently of said propeller shaft, said transmission means including a clutch means affording rotation of said propeller shaft by said drive shaft in one rotative direction, first electromagnetic means carried by said strut and including an electrical coil disposed around said propeller shaft for actuating said clutch means to afford rotation of said propeller shaft in said one direction, and second electromagnetic means carried by said strut to afford rotation of said propeller shaft in a direction opposite the direction afforded by said first electromagnetic means and for preventing said first electromagnetic means from actuating said clutch means when said second electromagnetic means is energized.

4. A marine propulsion device including a strut, means adapted for mounting said strut to a boat for horizontal and vertical swinging movement, a drive shaft rotatably mounted on said strut, a propeller shaft rotatably mounted on said strut and extending at an angle substantially less than 180 degrees to said drive shaft, a propeller on said propeller shaft and transmission means for connecting said propeller shaft to said drive shaft to provide selective rotation of said propeller shaft in each rotative direction and to allow rotation of said drive shaft independently of said propeller shaft, said transmission means including only one pair of intermeshing gears, first electromagnetic means carried on said strut to afford rotation of said propeller shaft in one direction, and clutch means affording rotation of said propeller shaft by said drive shaft in a direction opposite said one rotative direction, said clutch means including electromagnetic means comprising an electrical coil disposed around said propeller shaft to afford engagement of said clutch means so as to obtain rotation of said propeller shaft in a direction opposite the direction afforded by said first electromagnetic means and for preventing said first electromagnetic means from preventing rotation of said propeller shaft in said one direction.

5. The combination, in a marine propulsion device, of a strut provided with a drive shaft having a driving gear thereon, a gear housing connected with said strut and provided with propeller shaft bearings, a propeller shaft carried by said bearings and including a portion defining a pinion, a member having thereon a driven gear and an inner ring gear, means on said gear housing mounting said member for rotation independently of said propeller shaft and with said driven gear meshed with said driving gear, a planetary gear carrier, means on said gear housing mounting said carrier in juxtaposed position to said member for independent rotation of said carrier relative to said propeller shaft and to said member, a planetary gear rotatably carried by said carrier and meshed with said ring gear and with said pinion, first electromagnetic means operable to prevent rotation of said carrier to afford a first drive condition, and second electromagnetic means operable to connect said carrier with said member for common rotary movement to afford another drive condition.

6. The combination in a marine propulsion device of a strut provided with a drive shaft having a driving gear thereon, a gear housing connected with said strut and provided with propeller shaft bearings, a propeller shaft carried by said bearings and including a portion defining a pinion, a member having thereon a driven gear and an inner ring gear, means on said gear housing mounting said member for rotation independently of said propeller shaft and with said driven gear meshed with said driving gear, a planetary gear carrier, means on said gear housing mounting said carrier in juxtaposed position to said member for independent rotation of said carrier relative to said propeller shaft and to said member, a planetary gear rotatably carried by said carrier and meshed with said ring gear and with said pinion, first electromagnetic means operable to prevent rotation of said carrier to afford a first drive condition, and second electromagnetic means operable to connect said carrier with said member for common rotary movement to afford another drive condition, and to prevent said first electromagnetic means from preventing rotation of said carrier when said second electromagnetic means is operable to connect said carrier with said member for common rotary movement.

7. The combination in a marine propulsion device, of a strut provided with a drive shaft having a driving gear thereon, a gear housing connected with said strut and provided with propeller shaft bearings, a propeller shaft carried on said bearings and including a portion defining a pinion, a member having thereon a driven gear and an inner ring gear, means on said gear housing mounting said member for rotation independently of said propeller shaft and with said driven gear meshed with said driving gear, a planetary gear carried, means on said housing mounting said carrier in juxtaposed position to said member for independent rotation of said carrier relative to said propeller shaft and to said member, a planetary gear rotatably carried on said carrier and meshed with said ring gear and with said pinion, first electromagnetic means operable to connect said carrier with said member for common rotary movement to afford a first drive condition, and second electromagnetic means operable to prevent rotation of said carrier to afford another drive condition and to prevent said first electromagnetic means from connecting said carrier with said member for common rotary movement.

8. The combination in a marine propulsion device of a strut provided with a drive shaft having a driving bevel gear thereon, a gear housing connected with said strut and provided with bearings, a propeller shaft carried on said bearings and including a pinion portion, a drive connection from said drive shaft to said propeller shaft including a first element rotatably carried on said propeller shaft for independent rotation of said first element relative to said propeller shaft, said first element including a cylindrical outer surface, an bevel gear meshing with said driving bevel gear, and an inner ring gear, a carrier element rotatably carried on said propeller shaft juxtaposed to said first element for independent rotation of said carrier element relative to said propeller shaft and to said first element and including a cylindrical outer surface adjacent to and aligned with said surface of said first element, a series of gears rotatably carried on said carrier element and meshing with said ring gear and with said pinion portion, and a wrap spring disposed around said outer surfaces of said first element and said carrier element and including a first coil at one end thereof fixed to said first element and a second coil at the other end thereof normally free of said carrier element, first electromagnetic means carried by said strut for preventing rotation of said carrier element to afford rotation of said propeller shaft in a reverse drive condition, and means for electromagnetically attracting said spring into frictional engagement with said outer surface of said carrier element to afford common rotary movement of said first element and said carrier element thereby affording rotation of said propeller shaft in forward drive condition.

9. A combination in accordance with claim 8 including means for preventing either one of said first electromagnetic means and said electromagnetically attracting means from respectively preventing rotation of said carrier element and attracting said spring into frictional engagement with said outer surface when the other of said first electromagentic means and said electromagnetically attracting means is respectively preventing rotation of said carrier element and attracting said spring into frictional engagement with said outer surface of said carrier element.

10. The combination in a marine propulsion device of a strut provided with a drive shaft having a driving bevel gear thereon, a gear housing connected with said strut and provided with bearings, a propeller shaft carried by said bearings and including a pinion portion, a drive connection from said drive shaft to said propeller shaft including a first element having a bevel gear meshing with said driving bevel gear, said first element also having an inner ring gear, said first element being independently rotatable with respect to said propeller shaft, a carrier element rotatably carried on said propeller shaft juxtaposed to said first element for independent rotation of said carrier element relative to said propeller shaft and to said first element and having a portion of magnetizable material, gears rotatably carried by said carrier and meshing with said ring gear and with said pinion portion, a wrap spring disposed around said first element and said carrier and having one end connected to said first element and the other end free of said carrier, said wrap spring including a portion of magnetizable material, first electromagnetic means carried by said strut comprising an electrical winding disposed around a movable rod having an end engageable with said carrier when said winding is energized for preventing rotation of said carrier to afford rotation of said propeller shaft in one direction and provide a reverse drive condition, and means including an electrical winding for establishing electromagnetic flux in a path including said wrap-spring portion and said carrier portion to thereby draw said wrap spring into frictional engagement with said carrier and said first element for common rotary movement, and to provide a forward drive condition and to thereby prevent said rod end from engaging said carrier to prevent carrier rotation.

11. A combination in accordance with claim 10 wherein said electrical winding for establishing said flux path is disposed around the axis of said propeller shaft.

12. A combination in accordance with claim 10 wherein said rod end is disposed in the path of said other end of said wrap spring to block said wrap spring from being drawn into frictional engagement with said carrier and said first element when said first electromagnetic means is energized to cause said rod end to engage said carrier.

13. An electromagnetically operable drive comprising first and second elements, means including a first electromagnetic means including a first stationary coil for preventing rotation of one of said first and second elements, other means including a second electromagnetic means including a second stationary coil for affording common rotary movement of said first and second elements, and means for preventing either one of said first and second electromagnetic means engaging one of said elements from functioning when the other of said first and second electromagnetic means is functioning.

14. A transmission comprising a driven member having a pinion portion, a driving member having an inner ring gear, a planetary gear carrier, means mounting said gear carrier and said driving member for coaxial rotation with each other and with said driven member, and for relative rotary movement therebetween, a planetary gear on said carrier meshed with said ring gear and with said pinion portion, means engageable with said carrier for preventing rotation of said carrier, and means for connecting said carrier and said driving member for common rotary movement, said means for connecting said carrier and said driving member for common rotary movement including a fixed electromagnetic coil.

15. A transmission in accordance with claim 14 wherein said means for preventing rotation of said carrier includes an electromagnetic means.

16. A transmission comprising a driven member having a pinion portion, a driving member having an inner ring gear, a planetary gear carrier, means mounting said gear carrier and said driving member for coaxial rotation with each other and with said driven member, and for relative rotary movement therebetween, a planetary gear on said carrier meshed with said ring gear and with said pinion portion, means for preventing rotation of said carrier, and means for connecting said carrier and said driving member for common rotary movement, said means for preventing rotation of said carrier including a first electromagnetic means including a first fixed coil, said means for connecting said carrier and said driving member for common rotary movement includes a second electromagnetic means including a second fixed coil, and wherein means are provided either for preventing said first electromagnetic means from preventing rotation of said carrier and for preventing said second electromagnetic means from connecting said carrier and said driving member for common rotary movement when the other of said first and second electromagnetic means is respectively preventing rotation of said carrier and connecting said carrier and said driving member for common rotary movement.

17. A transmission comprising a driven member having a pinion portion, a driving member having an inner ring gear, a planetary gear carrier, means mounting said gear carrier and said driving member on said driven member for coaxial rotation independently of one another, and a planetary gear on said carrier meshed with said ring gear and with said pinion portion, means engageable with said carrier for connecting said carrier and said driving member for common rotary movement, and means engageable with said carrier for preventing rotation of said carrier, said carrier and driving member connecting means and said carrier rotation preventing means including interfering means for preventing one of said carrier and driving member connecting means and said carrier rotation preventing means from engaging said carrier when said carrier is engaged by the other of said carrier and driving member connecting means and said carrier rotation preventing means.

18. A transmission in accordance with claim 17 wherein said means for preventing rotation of said carrier includes an electromagnetic means.

19. A transmission in accordance with claim 17 wherein said means for connecting said carrier and said driving member for common rotary movement includes an electromagnetic means.

20. A transmission in accordance with claim 17 wherein said means for preventing rotation of said carrier includes a first electromagnetic means, said means for connecting said carrier and said driving member for common rotary movement includes a second electromagnetic means, and wherein means are provided either for preventing said first electromagnetic means from preventing rotation of said carrier and for preventing said second electromagnetic means from connecting said carrier and said driving member for common rotary movement when the other of said first and second electromagnetic means is respectively preventing rotation of said carrier and connecting said carrier and said driving member for common rotary movement.

21. An electromagnetically operable drive comprising first and second members, a wrap spring connected with one of said first and second members and having a free-end portion encircling a portion of the other of said first and second members and normally free of pressure engagement therewith, means including a first electromagnetic means for preventing rotation of said other of said first and second members, and means for preventing said first electromagnetic means from preventing rotation of the other of said first and second members and for establishing an electromagnetic flux path including the other of said first and second members and a coil of said spring whereby to draw said coil into frictional contact with said first and second members sufficient to effect a wrap of said spring about said first and second members in operative pressure engagement and driving connection thereto.

22. An electromagnetically operable drive comprising first and second members, a wrap spring connected with one of said first and second members and having a free-end portion encircling a portion of the other of said first and second members and normally free of pressure engagement therewith, means including a first electromagnetic means for establishing an electromagnetic flux path including one of said first and second members and a coil of said wrap spring whereby to draw said coil into frictional contact with said first and second members sufficient to effect a wrap of said spring about said first and second members in operative pressure engagement and driving connection thereto, and means for preventing rotation of said other of said first and second members and for preventing said first electromagnetic means from drawing said coil into frictional contact with said first and second members when said means is preventing rotation of said other of said first and second members.

23. An electromagnetically operable drive comprising first and second elements, one of said first and second elements including a ferro-magnetic cylindrical portion, a ferro-magnetic part extending radially outwardly from said cylindrical portion, and a flux resistant portion connecting said cylindrical portion and said radially extending part, a wrap spring connected with said other of said first and second elements and having a free-end portion with at least a terminal coil of magnetizable material, said terminal coil being in encircling relation to a part of said cylindrical portion, in adjacent relation to said radially extending part, and normally free of pressure engagement with said cylindrical portion, means including first electromagnetic means for preventing rotation of said one of said first and second elements, means defining a path for electromagnetic flux including said radially extending part, said encircled part of said cylindrical portion, and said terminal coil, and means for establishing flux on said path, whereby incident to the flow of flux on said path, said terminal coil is drawn radially inwardly toward said encircled part of said cylindrical portion and axially toward said radially extending part into frictional contact with said cylindrical portion and with said radially extending part to effect wrapping of said spring about said cylindrical portion in operative pressure engagement and driving connection therewith to afford common rotary movement of said first and second elements.

24. A drive in accordance with claim 23 wherein when said first electromagnetic means is preventing rotation of one of said first and second elements, said wrap spring is blocked by said first electromagnetic means from being drawn into frictional engagement with said cylindrical portion, and wherein when said wrap spring is drawn into frictional engagement with said cylindrical portion said first electromagnetic means is blocked by said wrap spring from preventing rotation of said one of said first and second elements.

25. An electromagnetically operable clutch comprising first and second elements, one of said first and second elements having a ferro-magnetic cylindrical portion, a ferro-magnetic annular pole disposed radially outwardly from said cylindrical portion, and a series of circumferential notches on said pole, a wrap spring connected with the other of said first and second elements and having a free-end portion of magnetizable material including at least one coil encircling a part of said cylindrical portion adjacent to said pole and being normally free of pressure engagement with said cylindrical portion and said pole, said wrap spring being sufficiently extendable to partially block entry into said notches when said spring is axially extended, means including first electromagnetic means having a movable rod selectively engageable with said notches for preventing rotation of said one of said first and second elements, means defining a path for electromagnetic flux including said encircled part of said cylindrical portion, said pole and said one coil, said means for defining a path for electromagnetic flux also including a flux resistant material between said encircled part of said cylindrical portion and said pole, and means for establishing flux on said path, whereby incident to the flow of flux on said path, said coil of said wrap spring is drawn towards said ferro-magnetic pole and radially inwardly into frictional contact with said cylindrical portion to effect wrapping of said spring about said cylindrical portion in operative pressure engagement and driving connection therewith to afford common rotary movement of said first and second elements and thereby partially block said notches to prevent engagement therewith by said rod of said first electromagnetic means, and whereby when said rod is engaged with said notches, said coil of said wrap spring is blocked by said rod from being drawn toward said pole, thereby preventing said wrap spring from wrapping about said cylindrical portion to afford common rotary movement of said first and second elements.

26. An electromagnetically operable drive comprising a fixed part, a driven shaft having a pinion portion, a driving gear rotatably carried by said shaft and having a cylindrical hub and an inner ring gear, a clutch element rotatably carried by said shaft and having a cylindrical portion and a series of circumferential notches on said cylindrical portion, a wrap spring connected with said driving gear and extending in encircling relation to said cylindrical portion and having a free-end portion of magnetizable material including at least one coil in normally free encircling relation to a part of said cylindrical portion of said clutch element and in adjacent relation to said fixed part, said wrap spring being sufficiently axially extensible to at least partially block entry into said notches, a planetary gear carried by said clutch element for connecting said clutch element to said pinion portion of said shaft and to said ring gear of said driving gear whereby independent rotation of said clutch element relative to said driving gear and to said shaft is afforded, means including a first electromagnetic means having a movable rod with an end engageable with one of said notches for preventing rotation of said clutch element and an electrical winding disposed around said rod to effect notch engaging movement of said rod when said winding is energized, means for energizing said electrical winding so as to establish an electromagnetic flux path including said fixed part, said encircled part of said cylindrical portion of said clutch element and said one coil, said flux path establishing means also including means for establishing a magnetic gap in said flux path between said relatively fixed part and said cylindrical portion of said clutch element and comprising an insert of nonmagnetic material between said cylindrical portion and said fixed part whereby incident to the establishment of said magnetic flux in said path, said one coil is drawn radially inwardly toward said encircled part of said cylindrical portion into sufficient frictional contact with said cylindrical portion to effect a wrapping of said spring about said cylindrical portion in driving connection therewith to afford common rotary movement of said driving gear and said clutch element and is drawn axially so as to partially block said notches to prevent said rod end of said first electromagnetic means from engaging said notches to prevent rotation of said clutch element, and whereby when said rod end is engaged with said notches, said one coil is blocked, by said rod, from being drawn toward said encircled part thereby preventing said spring from wrapping about said cylindrical portion to afford common rotary movement of said driving gear and said clutch element.

27. In a marine propulsion device the combination of a strut, a first shaft rotatably mounted on said strut and having a first gear thereon, a second shaft rotatably mounted by said strut and including a portion defining a pinion and extending at an angle substantially less than 180 degrees to said first shaft, a member having thereon a second gear in engagement with said first gear and having an inner ring gear, means on said strut mounting said member for rotation independently of said second shaft, a planetary gear carrier, means on said strut mounting said carrier in juxtaposed position to said member for independent rotation of said carrier relative to said second shaft and to said member, a planetary gear rotatably carried by said carrier and meshed with said ring gear and said pinion, first electromagnetic means operable to prevent rotation of said carrier to afford a first drive condition and second electromagnetic means operable to connect said carrier with said member for common rotary movement to afford another drive condition.

28. A transmission comprising a driven member having a pinion portion, a driving member having an inner ring gear, a planetary gear carrier, means mounting said gear carrier and said driving member for co-axial rotation with respect to each other and with respect to said driven member and for relative rotary movement therebetween, a planetary gear on said carrier meshed with said ring gear and with said pinion portion, means including a first stationary coil for preventing rotation of said carrier, and means including a second stationary coil for connecting said carrier and said driving member for common rotary movement.

References Cited
UNITED STATES PATENTS

| | | | |
|---|---|---|---|
| 804,438 | 11/1905 | Simonds | 74—792 X |
| 1,217,059 | 2/1917 | Pollard | 74—782 X |
| 1,392,983 | 10/1921 | Tuttle | 74—792 |
| 1,886,692 | 11/1932 | Kapitza et al. | |
| 2,084,522 | 6/1937 | Cotal | 74—792 X |
| 2,106,603 | 1/1938 | Jacques | 74—792 X |
| 2,120,734 | 6/1938 | Cotal | 74—792 X |
| 2,277,517 | 3/1942 | Jaeger et al. | 74—792 X |
| 2,296,520 | 10/1942 | Griswold | 74—792 X |
| 2,668,460 | 2/1954 | Butterfield et al. | 74—792 X |
| 2,959,986 | 11/1960 | Irgens et al. | 74—792 |
| 2,975,648 | 3/1961 | Doerries. | |
| 3,228,497 | 1/1966 | Shneider | 192—12 |

FOREIGN PATENTS 1,127,080 12/1956 France.
1,267,375 6/1961 France.

OTHER REFERENCES

"Pushbutton Shifting," Machine Design, vol. 33, #26, P124, Dec. 2, 1961.

DONLEY J. STOCKING, *Primary Examiner.*

ARTHUR T. McKEON, *Examiner.*

J. R. BENEFIEL, *Assistant Examiner.*